US007782191B2

(12) United States Patent
Flores

(10) Patent No.: US 7,782,191 B2
(45) Date of Patent: Aug. 24, 2010

(54) PORTABLE ALARM APPARATUS FOR WARNING PERSONS

(76) Inventor: Tomas Flores, 8765 Tomnitz, #101, Las Vegas, NV (US) 89178

( * ) Notice: Subject to any disclaimer, the term of this patent is extended or adjusted under 35 U.S.C. 154(b) by 270 days.

(21) Appl. No.: 11/828,209

(22) Filed: Jul. 25, 2007

(65) Prior Publication Data

US 2009/0027192 A1    Jan. 29, 2009

(51) Int. Cl.
*G08B 1/08* (2006.01)
(52) U.S. Cl. ............... 340/539.12; 340/321; 340/573.1; 340/286.07; 128/903; 600/300
(58) Field of Classification Search . 340/539.1–539.32, 340/693.1, 628, 632, 573.1, 286.07, 321; 128/903; 600/300
See application file for complete search history.

(56) References Cited

U.S. PATENT DOCUMENTS

| 4,352,961 | A | | 10/1982 | Kumada et al. |
|---|---|---|---|---|
| 5,231,047 | A | | 7/1993 | Ovshinsky et al. |
| 5,417,222 | A | * | 5/1995 | Dempsey et al. ............ 600/509 |
| 5,436,622 | A | | 7/1995 | Gutman et al. |
| 5,552,772 | A | | 9/1996 | Janky et al. |
| 5,573,012 | A | | 11/1996 | McEwan |
| 5,580,251 | A | | 12/1996 | Gilkes et al. |
| 5,589,824 | A | | 12/1996 | Lynch |
| 5,707,745 | A | | 1/1998 | Forrest et al. |
| 5,711,302 | A | * | 1/1998 | Lampropoulos et al. .... 600/485 |
| 5,724,045 | A | | 3/1998 | Kawakami |
| 5,766,013 | A | | 6/1998 | Vuyk |
| 5,867,105 | A | | 2/1999 | Hajel |
| 5,986,206 | A | | 11/1999 | Kambe et al. |
| 5,990,995 | A | | 11/1999 | Ebihara et al. |
| 6,121,885 | A | | 9/2000 | Masone et al. |
| 6,160,478 | A | | 12/2000 | Jacobsen et al. |
| 6,162,985 | A | | 12/2000 | Parise |
| 6,165,641 | A | | 12/2000 | Striebel et al. |
| 6,165,646 | A | | 12/2000 | Takada et al. |
| 6,200,264 | B1 | | 3/2001 | Satherley et al. |
| 6,218,958 | B1 | | 4/2001 | Eichstaedt et al. |
| 6,221,531 | B1 | | 4/2001 | Vaughey et al. |
| 6,278,944 | B1 | | 8/2001 | Lui et al. |
| 6,317,611 | B1 | | 11/2001 | Kobayakawa et al. |
| 6,319,200 | B1 | * | 11/2001 | Lai et al. .................... 600/300 |
| 6,323,989 | B1 | | 11/2001 | Jacobson et al. |
| 6,326,901 | B1 | | 12/2001 | Gonzales |
| 6,356,841 | B1 | | 3/2002 | Hamrick et al. |

(Continued)

*Primary Examiner*—Brent Swarthout
(74) *Attorney, Agent, or Firm*—Fernandez & Associates, LLP

(57) ABSTRACT

Portable alarm apparatus for warning a person is provided which includes a manually portable housing or base unit; a constant power supply supported by the base unit, the constant power supply including an external power supply having an interface connectible to a power source external of the base unit, the constant power supply including an onboard power supply independent of the external power supply whose makeup includes at least one of: photovoltaic, piezoelectric and thermoelectric; a detection circuit supported by the base unit, the detection circuit being connected to the constant power supply, the detection circuit being operable to detect a monitored condition, the detection circuit including at least one of: a smoke detector, a carbon monoxide detector and a fire detector; and an alarm circuit supported by the base unit, the alarm circuit being connected to the constant power supply, the alarm circuit being operable in response to detection of the monitored condition by the detection circuit to produce an alarm signal for warning a person.

1 Claim, 5 Drawing Sheets

U.S. PATENT DOCUMENTS

| | | | |
|---|---|---|---|
| 6,362,743 B1 * | 3/2002 | Tanguay et al. | 340/630 |
| 6,366,871 B1 | 4/2002 | Geva | |
| 6,376,922 B1 | 4/2002 | Lake | |
| 6,377,843 B1 | 4/2002 | Naydenov et al. | |
| 6,384,743 B1 | 5/2002 | Vanderheiden | |
| 6,389,291 B1 | 5/2002 | Pande et al. | |
| 6,461,762 B1 | 10/2002 | Yang et al. | |
| 6,466,125 B1 | 10/2002 | Richards et al. | |
| 6,528,204 B1 | 3/2003 | Hikmet et al. | |
| 6,548,107 B2 | 4/2003 | Forbes et al. | |
| 6,590,150 B1 | 7/2003 | Kiefer | |
| 6,648,820 B1 | 11/2003 | Sarel | |
| 6,665,385 B2 | 12/2003 | Rogers et al. | |
| 6,685,334 B2 | 2/2004 | Kenny et al. | |
| 6,723,378 B2 | 4/2004 | Hrubesh et al. | |
| 6,731,207 B1 | 5/2004 | Swieboda et al. | |
| 6,743,021 B2 | 6/2004 | Prince et al. | |
| 6,748,250 B1 | 6/2004 | Berman et al. | |
| 6,756,896 B2 | 6/2004 | Ford | |
| 6,762,686 B1 | 7/2004 | Tabe | |
| 6,788,452 B2 | 9/2004 | Liang et al. | |
| 6,870,088 B2 | 3/2005 | Tachibana et al. | |
| 6,881,063 B2 | 4/2005 | Yang | |
| 6,909,486 B2 | 6/2005 | Wang et al. | |
| 6,911,764 B2 | 6/2005 | Pelrine et al. | |
| 6,913,713 B2 | 7/2005 | Chittibabu et al. | |
| 6,927,475 B2 | 8/2005 | Lu | |
| 6,936,761 B2 | 8/2005 | Pichler | |
| 6,937,191 B2 | 8/2005 | Puente Baliarda | |
| 6,970,731 B1 | 11/2005 | Jayaraman et al. | |
| 6,982,178 B2 | 1/2006 | LeCain, et al. | |
| 6,988,989 B2 | 1/2006 | Weiner et al. | |
| 7,002,555 B1 | 2/2006 | Jacobsen et al. | |
| 7,006,002 B2 | 2/2006 | Shornali | |
| 7,030,413 B2 | 4/2006 | Nakamura et al. | |
| 7,038,655 B2 | 5/2006 | Herb et al. | |
| 7,045,205 B1 | 5/2006 | Sager | |
| 7,046,153 B2 | 5/2006 | Oja et al. | |
| 7,064,751 B1 | 6/2006 | Triepels et al. | |
| 7,071,827 B2 | 7/2006 | Carroll | |
| 7,075,476 B2 | 7/2006 | Kim | |
| 7,079,020 B2 | 7/2006 | Stilp | |
| 7,084,771 B2 | 8/2006 | Gonzalez | |
| 7,087,025 B2 | 8/2006 | Baruch | |
| 7,110,163 B2 | 9/2006 | Webber et al. | |
| 7,113,177 B2 | 9/2006 | Franzen | |
| 7,142,351 B2 | 11/2006 | Chung et al. | |
| 7,242,514 B2 | 7/2007 | Chung et al. | |
| 7,299,079 B2 | 11/2007 | Rebec et al. | |
| 2002/0188181 A1 * | 12/2002 | Boit et al. | 600/300 |
| 2004/0236174 A1 * | 11/2004 | Boone et al. | 600/21 |
| 2005/0033124 A1 * | 2/2005 | Kelly et al. | 600/300 |
| 2006/0060512 A1 * | 3/2006 | Astle et al. | 210/85 |
| 2007/0082652 A1 * | 4/2007 | Hartigan et al. | 455/404.2 |
| 2007/0130657 A1 * | 6/2007 | Rogers et al. | D24/107 |

* cited by examiner

PORTABLE ALARM APPARATUS FOR WARNING PERSONS

FIELD OF THE INVENTION

The present disclosure relates generally to an alarm apparatus for warning persons of dangerous conditions.

BACKGROUND OF THE INVENTION

An improved alarm apparatus for warning persons about potentially dangerous conditions can provide numerous benefits. These benefits, among many, include the potential of: Saving lives, reducing the occurrence of personal injuries, reductions in medical care necessary to care for personal injuries, reduced demand for emergency medical and rescue services, improved personal safety, and the reduction in worry about dangerous conditions. Benefits of an improved alarm apparatus for warning persons about dangerous conditions can be greater than ordinary for segments of the population who are frequently recognized as being at greater risk of injury or susceptible to dangerous conditions such as, for example: the physically or mentally challenged, medically ill or incapacitated, persons who suffer limited mobility, persons who are lost or unfamiliar with their surroundings, persons who do not speak or read the local language, persons who suffer from hearing or vision impairment, the elderly and children.

For the reasons stated above, and for other reasons stated below which will become apparent to those skilled in the art upon reading and understanding the present specifications, there is a need in the art for an improved alarm apparatus for warning persons of potentially dangerous conditions. The above-mentioned shortcomings, disadvantages and problems are addressed herein, which will be understood by reading and studying the following specifications, including the drawings and claims set forth therein.

BRIEF DESCRIPTION OF THE INVENTION

In one aspect, the present disclosure provides an improved portable alarm apparatus for warning persons of potentially dangerous conditions. A portable alarm apparatus of varying scope is described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
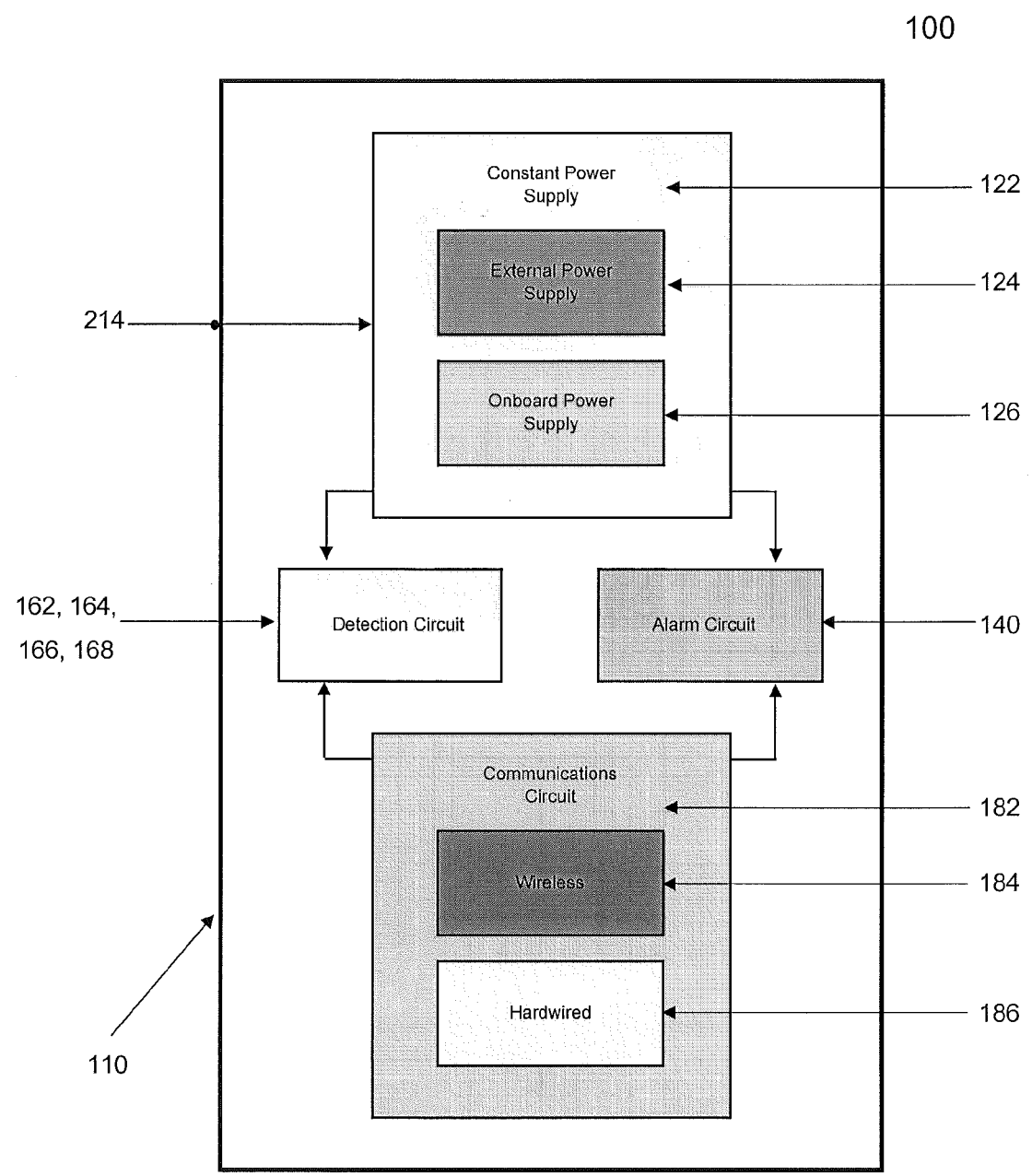
FIG. 1 is a simplified block diagram illustrating the base unit of a portable alarm apparatus according to an embodiment.

FIG. 1 is a simplified block diagram illustrating an embodiment of a manually portable alarm apparatus 100 for warning persons of a condition. In the illustrated embodiment, portable alarm apparatus 100 is adapted to warn a person or persons of a dangerous condition. In the specific arrangement illustrated in FIG. 1, portable alarm apparatus 100 is adapted to warn persons of a plurality of dangerous conditions.

Examples of dangerous conditions warned of by portable alarm apparatus 100 include, for example, smoke, fire and carbon monoxide gas. It is to be understood that portable alarm apparatus 100 can be adapted to warn persons of different specific conditions such as, for example: Security alarm conditions such as detected motion and detected intrusion and nuclear, biological and poisonous gas indicators.

A built in radio can warn of severe weather and local area emergency warnings as well as Amber and terrorist alerts. The radio can be of any type including: Digital, satellite, AM/FM or software-defined radio.

It is to be understood that, in various embodiments (not shown) portable alarm apparatus 100 can also be suitably adapted to warn persons of monitored biometric measurements or biometric conditions of a monitored person.

The monitored person can be the same person who is warned of the condition, or may be a different person such as a caregiver, nurse or physician, or, of course, both the monitored person and one or more caregivers may be warned of a monitored biometric condition.

Examples of persons whose biometric conditions can be monitored can include, for example, a person suffering from: A cardiac or circulatory condition such as an irregular heartbeat, weak pulse, low blood pressure, or high blood pressure and respiratory conditions such as low oxygen saturation and anaphylactic shock. Other conditions can include fever and hypothermia.

In various embodiments, measurements for various vitals can come via wireless communications, dry electrodes, smart textiles and medical equipment or apparatuses both invasive and non-invasive. Smart textiles can be used in the form of a baby blanket to monitor for conditions such as S.I.D.S. or in the form of a shirt or blouse for tracking or for monitoring conditions such as Alzheimer's. Smart textiles can be fire retardant as well.

It is to be understood that, in various embodiments (not shown) portable alarm apparatus 100 can also be suitably adapted to track individuals or assist in directional travel. Technologies can include: GPS, UWB, RF and Radar.

An individual would be warned of deviation from a coordinate or intended direction of travel along a compass heading, emission of a suitable radio frequency or other signal, or GPS vector and altitude. The apparatus can include a manual compass or programmed compass system readout.

In one embodiment, the portable alarm apparatus 100 can assist rescue operations locate the whereabouts of an individual or apparatus even through concrete.

In another embodiment, the portable alarm apparatus 100 can work in tandem with a main frame system capable of monitoring hundreds of individuals in hospitals, factories or numerous at home patients. Tracking is possible in the case of a missing child tagged with a discreet RF device whether missing or abducted from a hospital or daycare.

One of skill in the art will appreciate that a portable alarm apparatus according to embodiments (not shown) can be adapted to provide warnings for any suitable purpose or function.

It is to be understood that, in various embodiments (not shown), portable alarm apparatus 100 can also be suitably adapted to communicate using a myriad of input and output devices which can include: Associated plug-in modules, touch screen, haptic glove, microphone, watches, pagers, cell phones, wheelchair or necklace call button, wireless and hardwired computer devices and other portable alarm apparatus 100's.

The LED (light emitting diode) message display can be found on the base unit 110. The color of the LED display can be changed from red, to green or blue to accommodate viewing by persons who are color-blind. This message display can be used for a number of purposes, including: A scrolling alert message, time of day, radio station indicator, directional indicator when the tracking module is operated, or biometric information such as blood pressure or pulse, for example, when the biometric module is operated.

Figure 2:
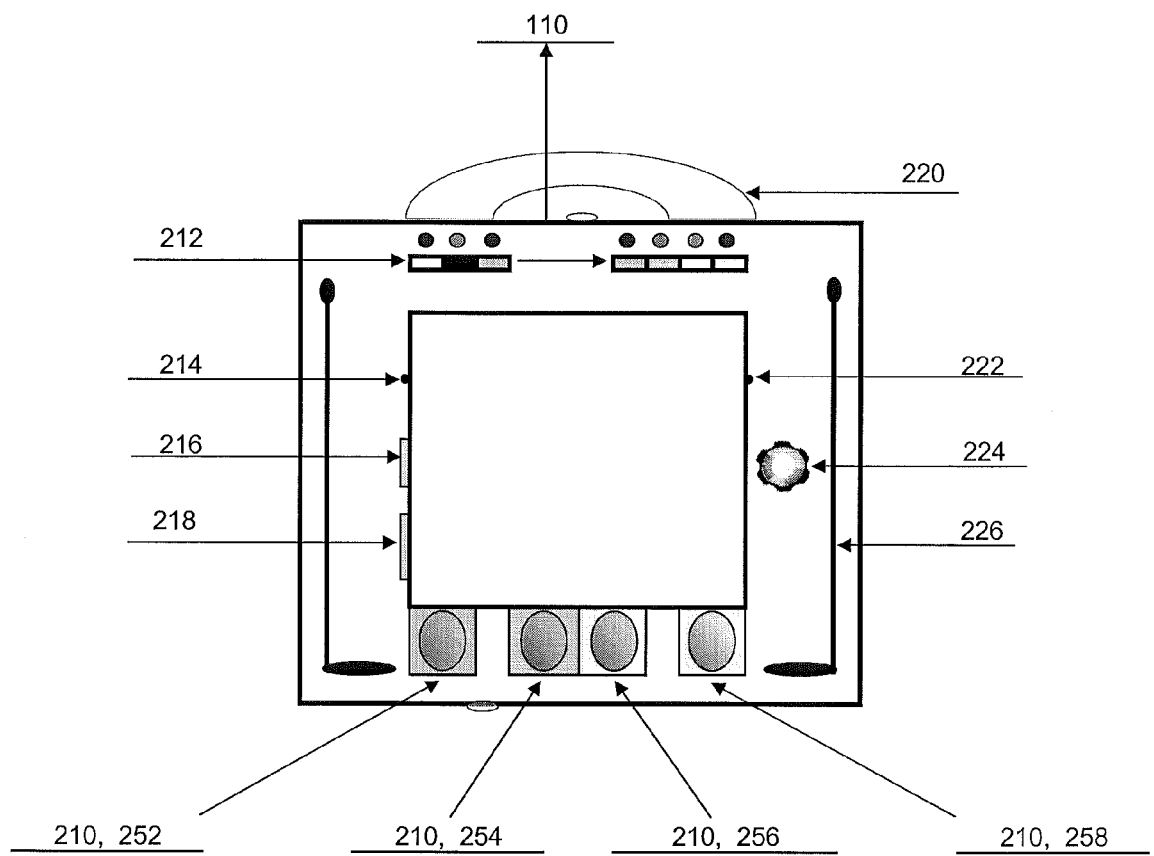
FIG. 2 is a simplified partial schematic illustration of the back view of the portable alarm apparatus' base unit according to an embodiment.
Figure 3:
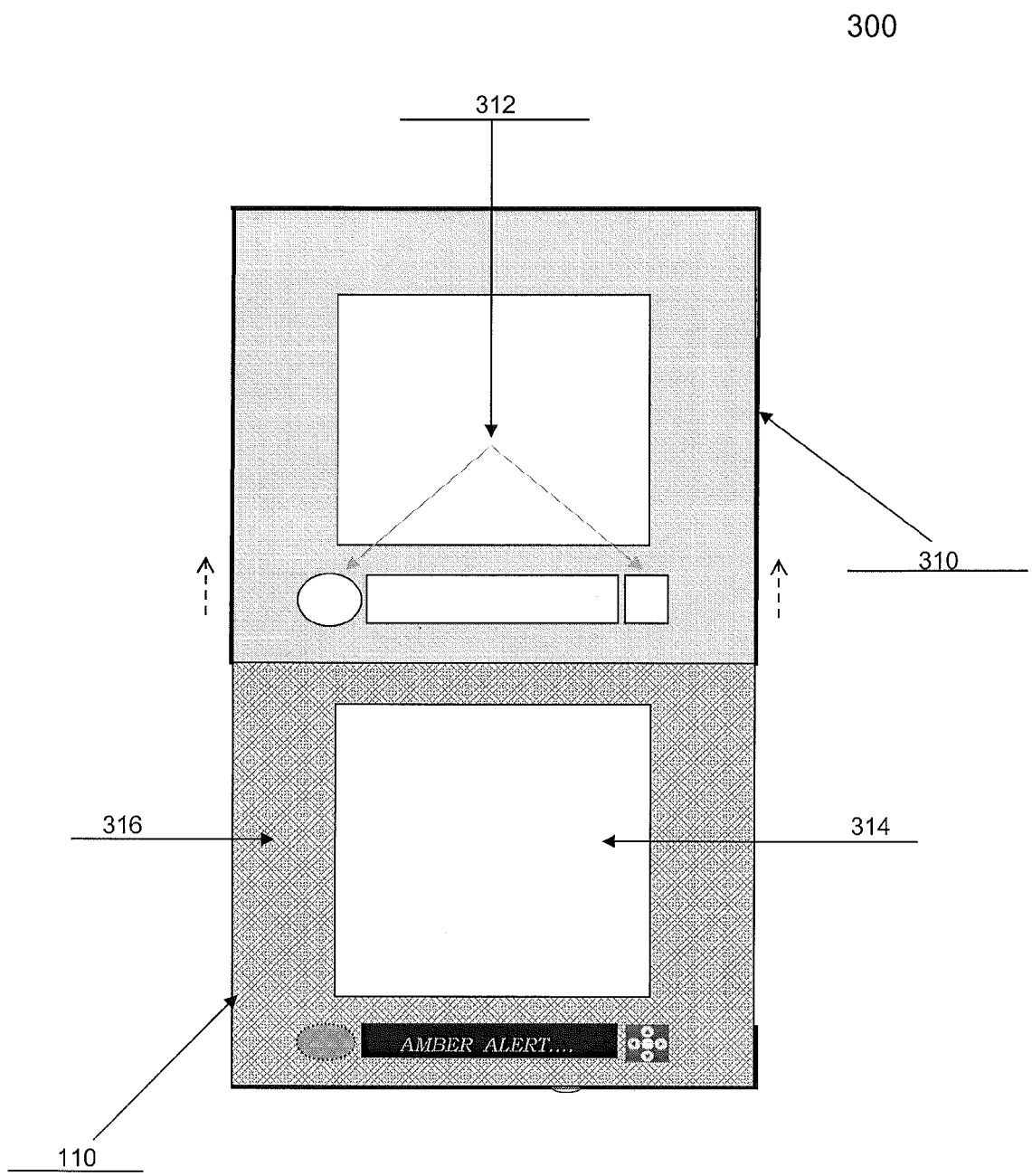
FIG. 3 is an illustration of a sliding decorative façade being removed from the front face of the portable alarm apparatus' base unit to expose a component of the water treatment system in an embodiment.

Base Unit 110 includes a removable cover 310 (FIG. 3). In a secured position, this cover allows for light to pass thru a translucent panel 312 to expose the white light or selected display unit 314. A light can be seen with or without cover 310 removed. This light is adjustable from a dim light for reading or a bright light in the case of an emergency for signaling or for illumination of a room or area. Via card adapter 218 (FIG. 2) photos can be downloaded from recording media, such as digital cameras, onto selected display unit 314.

In one embodiment, programming is enabled by allowing translucent panel 312 (FIG. 3) to be an electronically conductive touch screen and work in conjunction with panel 314 found on base unit 110. Key pad and digital radio with speaker from base unit 110 are operable thru said cover as well. The speaker and programmable keypad are waterproof.

Once removed, cover 310 exposes railings along the sides of base unit 110. This allows for the water purification housing to replace the cover along the rail system.

Figure 4:
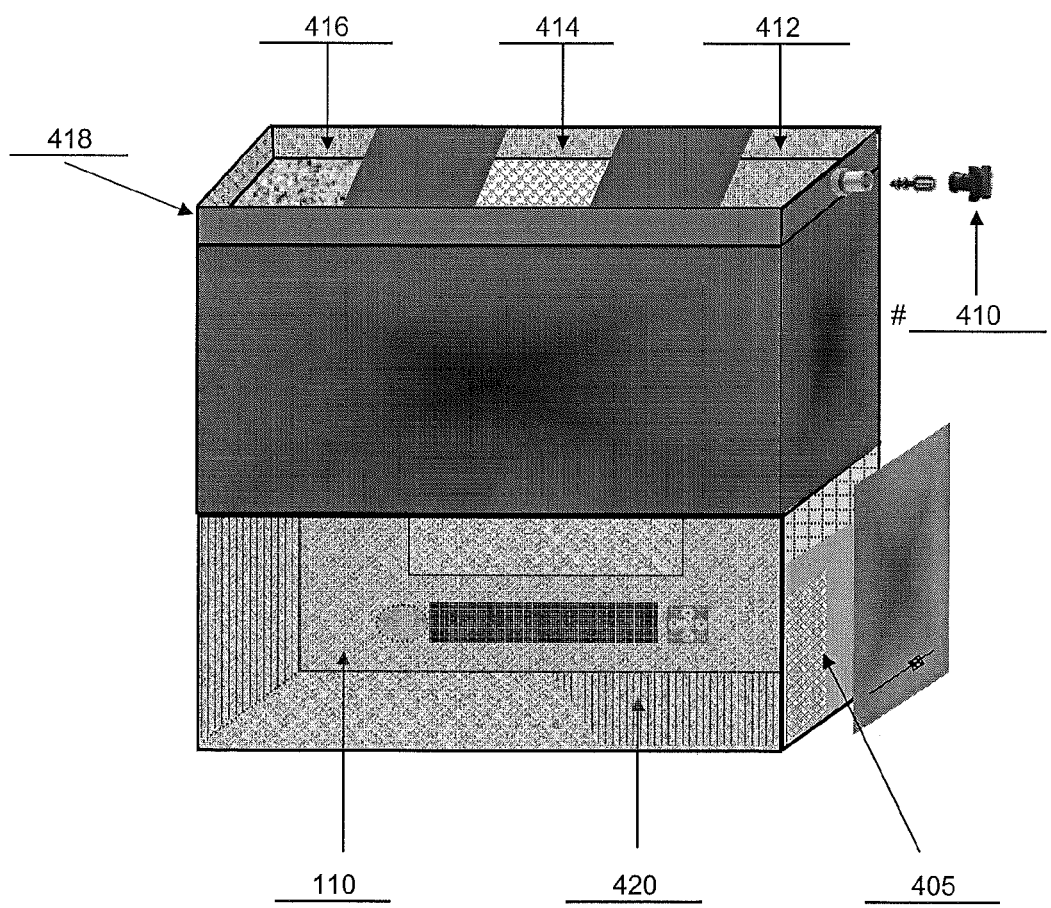
FIG. 4 is a simplified partial perspective front view of an attachable water treatment housing of an embodiment, with panels omitted and others exposed to show certain inner details.

Referring to FIG. 4, portable alarm apparatus 100 includes a water purification unit 400 supported by the base unit 110. Water purification unit 400 is operable for purifying water received from an external water source as well as to melt snow or boil water. Cover 310 (FIG. 3) must be removed to allow for placement of unit 400 onto the railing system of base unit 110 and to expose Ultraviolet or UVC lighting 316 (FIG. 3) from the front panel. The UVC lighting assists in the purification process.

In the specific embodiment illustrated, water purification unit 400 includes a water pump 410 and tube combination which can be connected to a nipple fitting on the unit 400. The tube has an air bellows to force pressure into the system for water filtration. Water pump 410 is operable to pump water from the external water source thru a series of water purification chambers 412, 414 and 416. The series of connected water purification chambers includes reverse osmosis and charcoal which selectively eliminate certain contaminants from water passing through their chambers.

Once thru the chambers, water collects in the housing of water purification unit 400 where it is further refined by exposure to ultraviolet illumination from UVC panel 316 (FIG. 3) and heat processing from heating element 420.

Water tight cover 418 is removable and its components replaceable. They include 410, 412, 414 and 416.

Water purification unit 400 includes a heating element 420 (FIG. 4) which is connected to a constant power supply from base unit 110 or from water purification unit 400 (Shown as 405).

Water tight cover 418 is removed from water purification unit 400 to expose heating element 420 and is operable for generating heat for warming a person and thus protecting the person from hypothermia or frostbite in cold weather conditions. Heating element 420 is also operable for assisting in water purification, melting snow for drinking purposes and for boiling water for cooking and disinfecting purposes. Heating element 420 can be of any suitable construction and its temperature adjustable.

In one embodiment, heating element 420 is operable to generate steam for warming a person by introducing steam through a tube (not shown) into a survival or an anti-hypothermic suit (not shown) having layers suitable for warming a person wearing the suit.

In various embodiments, this suit can be made to be inflatable, compact, fire retardant, can come in children's sizes and have accessories such as gloves, boots and a cap. It can also be made of a smart textile, having electronic circuitry for biometrics, thermal heating of an individual or tracking.

The base unit 110, airtight water purification unit 400 (When empty and with removable cover 418 locked in place) and related carrying gear are buoyant and can be used as a floatation device.

In one embodiment, water purification unit 400 and base unit 110 have power sources that are similar to each other in layer make-up and function (See 405 in FIG. 4). Water purification unit 400's power source can be used to maintain its functions or recharge the functions of the base unit 110.

In the specific embodiment of FIG. 1, portable alarm apparatus 100 includes constant power supply 122 housed and supported by base unit 110. Constant power supply 122 includes an external power connection 124 (214 of FIG. 2) and an external interface (not shown) which is connectible to an external power source.

In the specific arrangement illustrated, the external power interface includes a flexible power cord (not shown) having interchangeable plug adapters (not shown) for connecting to a standard alternating current wall outlet. Interchangeable plug adapters permit connections to different common wall outlets and thus permit universal operation for various countries.

Constant power supply 122 includes an onboard power supply 126 housed and supported by base unit 110. Onboard power supply 126 can work independent of the external power connection 124. Onboard power supply 126 can include any suitable portable power supply which can be supported by base unit 110. Examples include: Photovoltaic, piezoelectric and thermoelectric.

Figure 5:
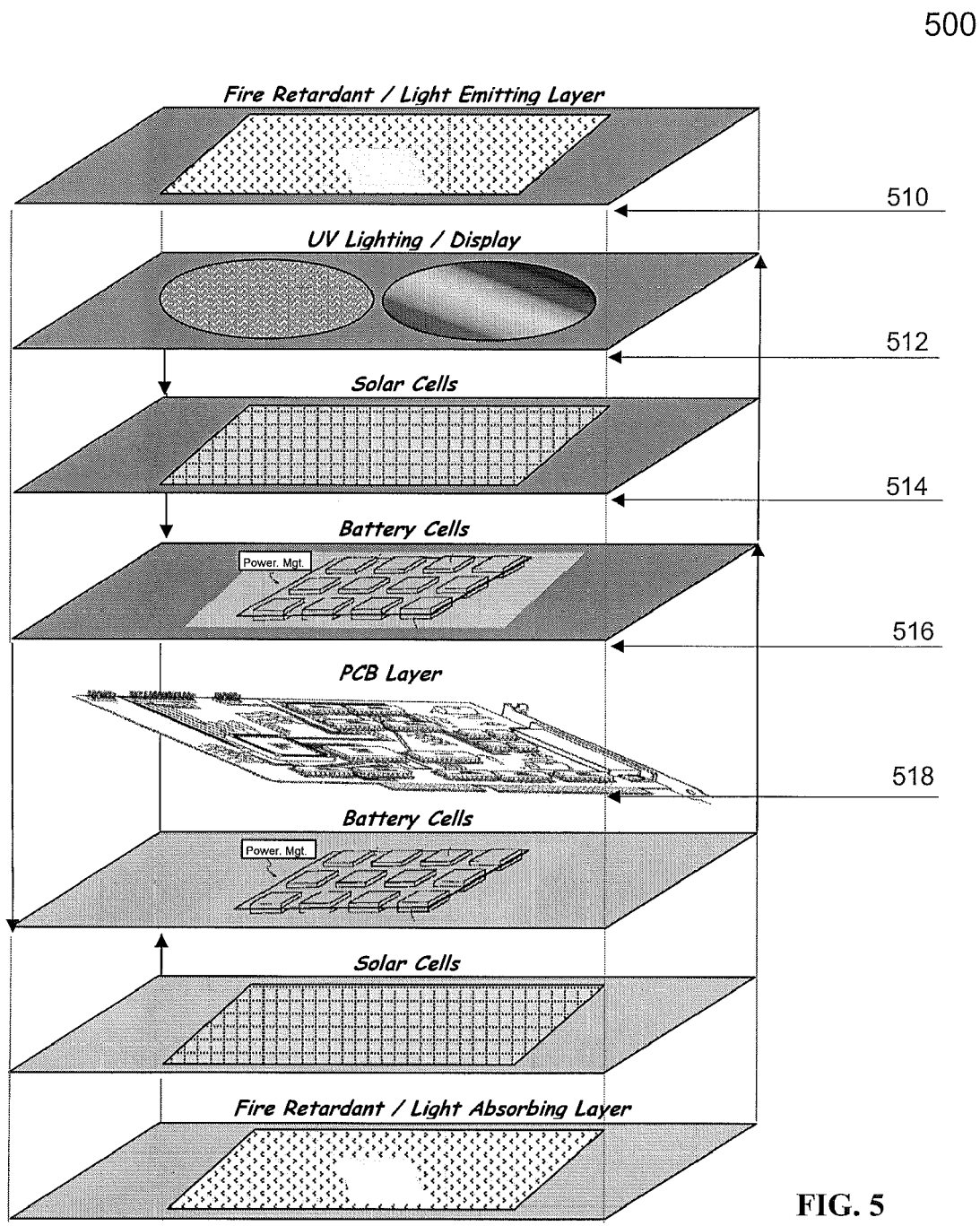
FIG. 5 is a partial layer diagram of a portable alarm apparatus according to an embodiment, with power layers in the base unit similar to those in the water purification unit.

As best shown in FIG. 5, in the illustrated embodiment, onboard power supply 126 includes an array of battery cells 516 connected to an array of photovoltaic or solar cells 514. Battery cells 516 are charged by operation of solar cells 514 when solar cells are exposed to suitable light, such as sunlight.

In the illustrated embodiment, solar cells 514 and battery cells 516 are also directly connected to circuitry 518 and thus can also provide a voltage potential and resulting electric current in the circuitry 518. Base unit 110 is composed of a continuous light absorbing wall for solar energy consumption. Ultraviolet or UVC lighting 316 (FIG. 3) and white light or selected display unit 314 also allow for light permeation thru the front panel to allow for solar cell charging as well.

Onboard power supply 126 (FIG. 1) also includes a manual generator 224 (FIG. 2) operable connected to the array of battery cells 516 (FIG. 5) to charge the battery cells when cranked. In the illustrated embodiment (FIG. 5), manual generator 224 is also directly connected to circuitry 518 to provide a voltage potential and resulting electric current in the circuitry when cranked.

It will be understood by those skilled in the art that onboard power supply 126 (FIG. 1) can include different suitable portable power supplies not specifically described herein. For example, in different specific arrangements, onboard power supply 126 can include a flexible solar collector or flexible thermal collector which is deployed in suitable conditions and connected by a hardwired connection to the battery cells 516.

Base unit 110 is capable of battery management via programming and via switches 212 (FIG. 2) located on back of base unit 110. These switches, along with their respective LED power indicator lights, can be used to selectively power on or off various functions of the system, including module 210 functions. An operator can determine which function or functions are needed and the LED lights will indicate if there is ample power to supply various power combinations.

In an embodiment (see FIG. 2), base unit 110 is adapted to receive and house a plurality of modules, 210. The illustrated embodiment shows housing 110 docking with four 210 modules. Base unit 110 and modules 210 are waterproof.

In the specific embodiment (FIG. 2), module plug-ins include biometric fingerprint technology used for protection of medical information and security for tracking. In other embodiments, Braille may be output onto a module's surface for alert messaging or the module can be used for program response input. Detection circuits can also be contained in each module as well as in the base unit itself.

Portable alarm apparatus 100 includes a plurality of detection circuits 162, 164, 166, 168 which are supported by the base unit 110. In the specific embodiment, illustrated in FIG. 1, portable alarm apparatus 100 includes four detection circuits 162, 164, 166, 168 contained in respective of the four modules 210.

In the embodiment illustrated in FIG. 1, each detection circuit 162, 164, 166, 168 is connected to the constant power supply 122 when the respective module 210 docks with base unit 110. Detection circuits 162, 164, 166, 168 when connected to constant power supply 122 are operable to detect respective monitored conditions.

Detection circuits 162, 164, 166, 168 each include a respective sensor or sensors (not shown) which is/are operable for monitoring a predetermined condition. It is to be understood that detection circuits 162, 164, 166, 168 can include any suitable sensor(s) adapted for monitoring any predetermined condition such as, for example, any condition previously described herein.

In the specific embodiment illustrated, detection circuits 162, 164, 166, 168 include respective sensors (not shown) selected from a function group. Detection circuit 162 along with module 252 (FIG. 2) include sensors (not shown) operable to detect biometrics including heart rate, respiration and other vital statistics.

Detection circuits 164 and 166 along with modules 254 and 256 include sensors (not shown) operable to tracking or monitoring people or objects as desired. In the specific embodiment illustrated, sensors would be compatible with various systems to include: The GPS (Global Positioning System), EPIRB (Emergency Position Indicating Radio Beacon), ELT (Emergency Locator Transmitter), PLB (Personal Location Beacon) and RADAR. The sensors would comply with the COSPAS/SARSAT satellite system as well.

Detection circuit 168 and module 258 include sensors compatible with signaling or communicating alerts to those that are challenged via peripherals such as: Computer devices, pagers, cell phones, watches, household lights and haptic glove.

The glove (not shown) works on the principal of haptic technology relaying information by accommodating for Braille, vibration variations for coding type of emergency and by applying forces or vibrations to awaken a sleeping individual. Vibrations and flashing lights can create a reporting system to label a warning type and relay this alert to the above mentioned peripherals.

In another embodiment, sensors can detect water inundation to alert of possible drowning or of an object, such as a boat, sinking. Working with a child's watch, sensors can trigger a timer to allow an adult to turn off the reporting function. This prevents an alarm broadcast, including a 911 call, from occurring in the event of a false alarm such as might occur when the watch is immersed during hand washing.

The base unit 110 includes detectors that include: infrared smoke detectors, ionic smoke detectors, photoelectric smoke detectors, a fire detector and carbon monoxide detector.

Portable alarm apparatus 100 includes alarm circuit 140 (FIG. 1) operable in response to detection of a monitored condition by detection circuit 162, 164, 166, 168 to produce an alarm signal for warning at least one person. In the specific embodiment illustrated, alarm circuit 140 is supported by base unit 110. It will be understood that, in other embodiments (not shown), alarm circuit 140 can be supported by any module 210.

In an alternative embodiment (not shown), alarm circuit 140 is integrated into the detector circuits 162, 164, 166, 168. Alarm circuit 140 is connected to the constant power supply 122. In the specific embodiment illustrated, alarm circuit 140 is operable to provide an audible alarm signal.

It will be understood that, in other embodiments (not shown), alarm circuit 140 can provide a audible alarm signal such as a mother's voice awakening a child to a fire alarm or a warning in Spanish, Cantonese, Korean or other programmable languages.

Portable alarm apparatus 100 incorporates at least one form of wireless communication which could include: Cellular, personal area network, wide area network, ultra wide band, radio frequency and radar. Platform examples are Zigbee, 3G, GSM, GPRS, EDGE and CDMA.

Upon detection of a condition by detection circuit 162, 164, 166, 168 (FIG. 1), wireless communications connection 184 is operable to transmit or receive a warning signal. Signal can be to or from portable alarm apparatus 100 or from related peripherals.

Portable alarm apparatus 100 is operable to receive identified warning signals from other portable alarm apparatus' or peripherals for warning persons in other locations of detected conditions. Such an arrangement or series of transmitted warning signals is useful, for example, to warn persons in remote locations within a large building of dangerous conditions detected by portable alarm apparatus 100 in another location in the same building or in a complex of buildings.

The portable alarm apparatus 100 thus includes a wireless alarm relay system which is operable in response to detection of a monitored condition by the detection circuit 162, 164, 166, 168 to produce a relayed alarm signal and to communicate the relayed alarm signal to a compatible alarm system or various peripherals.

Wireless communications connection 184 is selectively operable with a remote communications receiver (not shown). Base unit 110 and peripherals can be 911 compliant, providing for tracing of an alarm broadcast.

Portable alarm apparatus 100 includes hardwired communication connection 186 supported by base unit 110 suitable for internet communication with an internet protocol network (not shown). In one specific embodiment, the hardwired internet connection is via USB 216 (FIG. 2), although any suitable hardwired internet connection can be included.

Data such as a child's current photo, physical attributes and even fingerprints can be uploaded to portable alarm apparatus 100 and downloaded to law enforcement or other rescue agencies.

In the specific embodiment shown in FIG. 2, base unit 110 can support cellular communication via plug in port 222. This port allows for both power and coverage expansion for cellular phones. Optional kit (Not shown) can support connection of most major brands of cellular phones.

In the specific embodiment illustrated in FIG. 1, base unit 110 is lightweight and thus adapted to be manually carried. It can also be hung on a wall via adjustable strap 220 (FIG. 2) or placed on a desk top for displaying (See foldable legs 226 of FIG. 2)

In other embodiments (not shown), the base unit can be portable in a different manner and thus can include, for example, a set of wheels and a handle suitable for being rolled, a backpack frame with shoulder straps for being carried on a person's back, or a saddlebag or frame for being carried on a vehicle such as a bicycle, scooter or motorcycle. The adjustable strap 220 can be used to secure apparatus over a vehicles head rest.

In one embodiment, base unit 110 and water purification unit 400 are made up of specific element(s) and polymer layers to create durable and multi-functional housings. Elements such as silicon and titanium extol characteristics such as: Scratch, chemical, heat, moisture and pressure resistance.

Layer processing or assembly can include: Quantum Dots or Rods, PECVD, Laser or Flame Pyrolysis, Nano Technology and Roll to Roll processing.

FIG. 5 illustrates a layer function diagram of portable alarm apparatus 100 according to an embodiment. Portable alarm apparatus 100 includes integrated circuit assembly 500 which has a plurality of layers. In the specific embodiment illustrated, integrated circuit assembly 500 forms detection circuit 162, 164, 166, 168 and alarm circuit 140, constant power supply 122 and communications circuit 182 from FIG. 1.

Integrated circuit assembly 500 includes an outer fire retardant layer 510 which also transmits light. An ultraviolet light and display layer 512 is stacked adjacent fire retardant layer 510 to generate light which is passed outwardly through fire retardant layer 510.

Ultraviolet light and display layer 512 also absorbs light, which it then passes on to the solar cell layer 514, adjacent to it. A battery cell layer 516 is stacked adjacent the solar cell layer 514. Battery cells of battery cell layer 516 are charged by operation of solar cell layer 514. An inner integrated circuit layer 518 is stacked adjacent to the battery cell layer 516. Operation of integrated circuit layer 518 is powered by operation of battery cells in battery cell layer 516 and, alternatively, by operation of solar cell layer 514.

Although specific embodiments are illustrated and described herein, it will be appreciated by those of ordinary skill in the art that any arrangement which is calculated to achieve the same purpose may be substituted for the specific embodiments shown. This application is intended to cover any adaptations or variations. For example, one of ordinary skill in the art will appreciate that different specific implementations can be made that provide the required functions.

One of skill in the art will readily appreciate that the names of the apparatus are not intended to limit embodiments. Furthermore, additional apparatus can be added to the components, functions can be rearranged among the components, and new components to correspond to future enhancements and physical devices used in embodiments can be introduced without departing from the scope of embodiments. The terminology used in this application is meant to include all environments and alternate technologies which provide the same functionality as described herein.

I claim:

1. A portable alarm apparatus for warning a person, the portable alarm apparatus comprising:
   a manually portable base unit;
   an integrated circuit assembly;
   a constant power supply supported by the base unit, the constant power supply including an external power supply having an interface connectible to a power source external of the base unit, the constant power supply including an onboard power supply independent of the external power supply, and
   a detection circuit supported by the base unit, the detection circuit being connected to the constant power supply, the detection circuit being operable to detect a monitored condition; and an alarm circuit supported by the base unit, the alarm circuit being connected to the constant power supply, the alarm circuit being operable in response to detection of the monitored condition by the detection circuit to produce an alarm signal for warning at least one person; the integrated circuit assembly including a portion of at least one of: the detection circuit, the alarm circuit, and the constant power supply, the integrated circuit assembly including multiple layers, the layers including: an outer fire retardant layer adjacent to a light emitting layer, a solar cell layer adjacent to the light emitting layer, a battery cell layer adjacent to the solar cell layer, and an inner integrated circuit layer adjacent to the battery cell layer.

* * * * *